RECORD FILE

Filed Nov. 10, 1969

Inventor:
Arthur Manoff
By Gary, Parker,
Juettner, Pigott & Cullinan Att'ys

United States Patent Office 3,623,252
Patented Nov. 30, 1971

3,623,252

RECORD FILE

Arthur Manoff, Baltimore, Md., assignor to Acme Visible Records, Inc., Crozet, Va.

Filed Nov. 10, 1969, Ser. No. 875,459
Int. Cl. B42f *17/22*
U.S. Cl. 40—104.1 2 Claims

ABSTRACT OF THE DISCLOSURE

Card holder file for microfiche, the holder file being composed of cards secured in stepped arrangement with their margins bearing a dark color visible through the transparent overlying marginal index portions of the microfiche cards disposed in said holder file.

This invention relates to the filing of microfiche cards in a manner whereby their transparent marginal index portions or rather the data embodied thereon becomes readily visible for selective access thereto.

As is known, microfiche cards comprise flexible opaque films comprising transparent microfilm reproductions in the body thereof and transparent indexing indicia in the marginal portion thereof. This transparent marginal index portion is not readily visible in the microfiche card which, while the remaining body portion is opaque, is generally of a light color such as white or pink. The present invention provides means for rendering these microfiche index portions readily visible by filing the microfiche cards in flexible holder card means secured in marginally spaced relationship to each other on a suitable rigid holder. These holder card means form pockets between them, and their visible margins are provided with a dark color such as for example black. When the microfiche cards are disposed in the pockets between the holder cards with their index portions overlying the dark colored margins of the holder cards their visibility is greatly enhanced, that is when the microfiche card is filed adjacent the front of the holder card the dark or black border of the latter will show through the transparent indexing letter portions of the otherwise generally opaque microfiche card, and thus will provide a contrast which can be readily read and self-indexed.

The advantages and economies of the present invention, its details of construction and arrangement of parts, will be further apparent from a consideration of the following specification and accompanying drawings, wherein FIG. 1 is a plan view of the holder cards of the present invention mounted on a suitable runway frame with microfiche cards filed between them.

Figures 1, 2, 3, 4, 5:
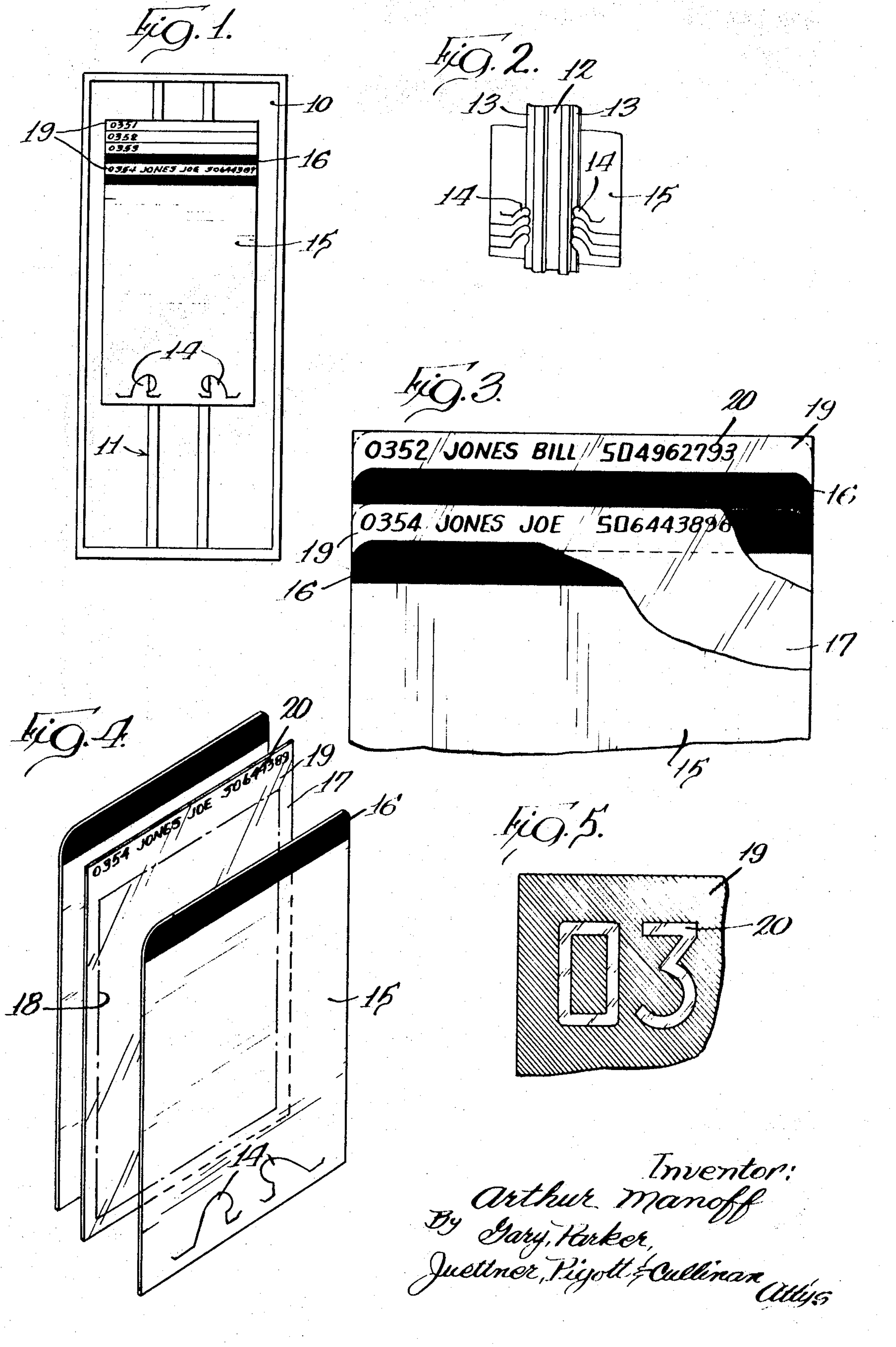
FIG. 2 is a fragmentary rear view of the runway portion of the frame of FIG. 1 with holder cards engaged thereon.
FIG. 3 is an enlarged fragmentary view of an assembly of holder cards with microfiche cards filed therebetween in accordance with the present invention.
FIG. 4 is an exploded perspective view of a portion of the arrangement of FIG. 3.
FIG. 5 is a fragmentary view of the index portion of the microfiche card.

Referring to the drawings, the reference numeral 10 indicates a frame having a runway 11 thereon which comprises a web portion 12 secured to the frame 11 and an opposed pair of elevated flanges 13, 13 beneath which there is adapted to be snapped the fingers 14, 14 struck up or die cut from the flexible holder cards 15. These die cuts 14, 14 are disposed adjacent the lower edge portion of the holder cards 15 and when a plurality of these cards are mounted on the runway 12 they are caused to be edgewise spaced from each other so that their upper margins which in this case are colored as at 16 are spaced from each other, this arrangement of flexible record cards mounted on runways in the manner indicated, other than their colored upper marginal edges, being known under the trademark Super-Visible.

In accordance with the present invention, the Super-Visible holder cards as indicated are provided with dark colored marginal portions on their edges opposite the edge at which the ears 14 are formed, and when a plurality of cards 15 are arranged or mounted on a runway 11 of the frame 10 in nested relationship with each other they form pockets between them. Between these pockets in accordance with the present invention there can be filed the microfiche cards 17 embodying microfilmed data on their body portions 18 in conventional manner. Likewise, these microfiche cards in conventional manner bear marginal index portions 19 embodying thereon transparent indicia 20 in the otherwise opaque body 17, the indicia 20 being generally in outline form as indicated in the detail of FIG. 5.

The size of the microfiche cards and the flexible holder cards 15 is such relative to each other that when a microfiche card is disposed between two holder cards the index portion 18 of the microfiche card lies against the colored margn 16 of the holder card and becomes visible through the data on the index portion of the microfiche card.

Although the drawings show the colder cards 15 mounted on a frame 10, it will be understood that the holder cards may be otherwise secured and without the aid of the ears 14 as by means of stapling, adhesives, stitching or otherwise securing the holder cards 15 in spaced relationship to each other so that their margin portions 16 are exposed or visible, and also although not shown one or both of the side edges of the assembled holder cards 15 may be secured together to form whole or partial envelopes.

It will also be understood that although the holder cards 15 are shown with dark colored visible margin portions 16, the whole of the card 15 may be of a dark color.

Although I have shown and described the preferred embodiment of my invention, it will be understood by those skilled in the art that changes may be made in the details thereof without departing from its scope.

I claim:

1. A filing assembly comprising a plurality of holder cards arranged in successive overlapping relationship and having successively exposed margins bearing a dark color, and a microfiche card between adjacent holder cards, a margin of said microfiche card having a relatively transparent portion therein and overlaying the dark margin of a holder card, so as to make said transparent portion on said microfiche visible.

2. The filing assembly of claim 1 wherein said holder cards comprise means adjacent their edge portions opposite their exposed margins for attachment to a support.

References Cited

UNITED STATES PATENTS

| | | | |
|---|---|---|---|
| 3,465,460 | 9/1969 | Dahl, Jr. | 40—105.5 |
| 1,822,878 | 9/1931 | Bauder | 40—78 |
| 1,475,568 | 11/1923 | Dawson | 40—104.05 |
| 2,761,452 | 9/1956 | Wassell | 40—124.4 |

ROBERT M. MICHELL, Primary Examiner
J. H. WOLFF, Assistant Examiner

U.S. Cl. X.R.

40—78.05, 104.03, 104.06